Patented Aug. 3, 1937

2,088,981

UNITED STATES PATENT OFFICE 2,088,981

TOOL COMPOSITION

William Bayard Sturgis, Chicago, Ill.

No Drawing. Application July 21, 1933,
Serial No. 681,555

4 Claims. (Cl. 75—136)

The present invention relates generally to tool compositions. More particularly the invention relates to that type of tool composition which is adapted to be used in the manufacture of cutting tools, dies, etc., for cutting, forming and drawing metals and other substances.

One object of the invention is to provide a tool composition of this type which is substantially homogeneous in texture and has a hardness approximating that of the diamond together with an extremely high melting point and tensile and compressive strengths sufficient to resist the shocks ordinarily met with in machine shop practice.

Another object is to provide a composition of the aforesaid type and character which is simple and inexpensive to manufacture and is so refractory that tools, made thereof, may be operated at a red heat without impairing, to the slightest degree, their cutting efficiency and durability.

A still further object is to provide a tool composition of the type and character under consideration that can be made by a sintering process requiring less heat than 2000° C., and with a smaller percentage of substances melting below 2000° C. than any composition heretofore produced having like characteristics.

Certain compounds of titanium are extremely hard. The carbide, nitride, boride and silicide are examples. These form the basis of my composition. The melting points of the first two are approximately 3140° C. and 2950° C., respectively.

It has already been proposed to sinter these metalloids. This requires a temperature of 2500° C., or over. The product thus produced, while exceedingly hard, is entirely too brittle for successful use as lathe tools and such. In an effort to overcome this difficulty, it has been proposed to cement the carbide and nitride together by means of a matrix of softer and more fusible metals melting at 1500° C., or under.

These softer and more fusible metals, when added in sufficient amount to serve as a matrix, not only lower the sintering temperature of the mass, but also lower the melting point and temperature at which the final product softens. If, therefore, a softening of the cutting edge can result from the addition of so much soft metal, (which is indicated by experiments and tests), this, then, is a serious disadvantage.

My composition, however, does not have this defect because, in place of soft metals, the matrix is wholly, or very largely, composed of tantalum. Tantalum has a melting point of approximately 2900° C., which is slightly less than the melting point of the titanium nitride, and is one of the hardest metals known.

My method of producing a tool composition does not start with metallic tantalum, however, but employs tantalum hydride instead.

The hydride, when heated to approximately 1200° C. to 1500° C., decomposes into pure metallic tantalum that is, pure tantalum metal. Thus, while my process requires a sintering temperature no higher than if the aforementioned lower melting metals had been used, a final product is obtained which has a tantalum metal matrix and therefore a much higher melting point than these other mixtures.

For certain classes of work, it is advantageous to use a small amount of a fluxing agent to assist the tantalum in flowing freely during the period when the hydride is decomposing. Such a flux may consist of a small quantity of certain metals, or their compounds.

Examples of substances, which have been found suitable for this purpose are the oxides and metals of the iron group, especially cobalt. Cobalt oxide is relatively inexpensive, easy to obtain, and easy to pulverize.

If cobalt oxide is used, the reaction is as follows: The hydrogen, liberated by the decomposition of the tantalum hydride, combines with the oxygen of the cobalt oxide, leaving pure metallic tantalum intimately admixed with a lesser quantity of pure metallic flux. Under these conditions, the flux immediately reacts to increase the normal flowing action of the tantalum.

This novel function of small quantities of oxides and metals of the iron group acting as a flux, is clearly seen to differ radically from their previous use as components of alloys. In such small quantity, the flux does not injuriously lower the high melting point of the final product.

The real advantage of composite tool points of this nature, over the present high-grade alloy steels, is their greater hardness and ability to withstand higher operating temperatures. A composition, therefore, which contains a large percentage of low fusing metal is obviously inferior to my composition of much higher melting point, assuming both have sufficient toughness to resist shock.

These, then, are the advantages of my product over other compositions in use today.

The method of preparation of my tool composition is as follows:

Either a single compound of titanium, such as the carbide, or a mixture of two or more compounds, such as the carbide and nitride, may be used. In any event, the titanium compound, (or compounds), is first very finely pulverized in a ball mill or like pulverizing or grinding instrumentality. This usually requires at least twenty-four hours grinding. The tantalum hydride is preferably ground in a separate ball mill. If cobalt oxide be used as a flux, this is mixed with the tantalum hydride, and the two are pulverized or ground together. The ratio of cobalt to tantalum is never greater than 1 to 1 by weight, and is usually about 1 to 3. This ratio may vary according to individual requirements. The proportion of tantalum to titanium compounds may vary from approximately 1 to 24 by weight up to 1 to 2⅓, depending upon whether the object is a die or a tool, and the purpose for which it is to be used. In general, greater percentages of tantalum hydride are used when making tools subject to shock, and lesser percentages are used in dies for drawing metals, etc.

After the preliminary grinding operation is over, the titanium compound or compounds, together with the tantalum hydride and flux, are placed in a ball mill and a further grinding of about 10 to 12 hours is made.

The mixture is then removed from the mill, is moistened slightly until it has the consistency of a dense clay, then pressed into blanks of the desired shape. For this work, a pressure of 1000 pounds per square inch, or less, is usually sufficient.

An alternative to this method is to compress the dry powder under a hydraulic press. In this case, very much higher pressures are required. Up to 40,000 pounds per square inch have been used. As this is a more expensive procedure, my previously described "wet" process is preferred.

The blanks are then baked in an oven, at a temperature of approximately 900° C., after which they may be machined if desired. They are then sintered in a high-temperature furnace, in a neutral, or reducing atmosphere, or in vacuo, at a temperature ranging from 1200° to 1600° C. In any event, it should never be necessary to exceed 2000° C., which is insufficient to sinter the titanium compounds.

The titanium compound serves as a base or cutting agent for the tool composition and the pure tantalum metal that results from the sintering operation constitutes a matrix or cementing agent for the particles of titanium compound. The cobalt oxide which in powdered form is mixed with the tantalum hydride serves, because of the fact that it has a much lower melting point than the tantalum hydride, as a fluxing agent whereby during the sintering operation the tantalum is caused to flow more readily into coherent relation with the titanium compound. The titanium compound during the sintering operation does not melt or become sintered but goes into solution in the tantalum cobalt alloy. This is indicated by the fact that the titanium compound recrystallizes from this solution in such a manner that the crystal structure of the composition is noticeably different from what would have been obtained had the titanium compound merely sintered together with the tantalum cobalt alloy. The portion of the cobalt oxide which coats or adheres to the particles of titanium compound facilitates the titanium compound going into solution during the sintering operation.

The tool-forming blanks which are made with the herein described composition are mounted by jumping or soldering them onto recessed steel shanks, which serve as a holding or supporting medium. Dies made of the present composition may be sweated into recessed steel blanks, which may then be secured as desired.

The invention is not to be understood as restricted to the details set forth, since these may be modified within the scope of the appended claims, without departing from the spirit and scope of the invention.

What I claim and desire to secure by Letters Patent is:

1. A tool composition comprising a base of superhard titanium compound from the group composed of titanium nitride, boride and silicide, and a tantalum metal matrix or cementing agent united by heat into coherent relation with the base.

2. A tool composition comprising a base of superhard titanium compound and a tantalum metal matrix or cementing agent united by heat into coherent relation with the base.

3. A tool composition composed of a base of superhard titanium compound from the group composed of titanium nitride, boride and silicide, and a tantalum metal matrix or cementing agent united into coherent relation with the base by heat and in the presence of an element which acts to reduce the fluxing temperature of the tantalum without impairing the toughness and hardness of the latter.

4. A tool composition composed of a base of superhard titanium compound and a tantalum metal matrix or cementing agent united into coherent relation with the base by heat and in the presence of an element which acts to reduce the fluxing temperature of the tantalum without impairing the toughness and hardness of the latter.

WILLIAM BAYARD STURGIS.